Oct. 23, 1956  H. BROWN  2,768,128
METHOD FOR PROCESSING BLACK OIL
Filed Oct. 29, 1951
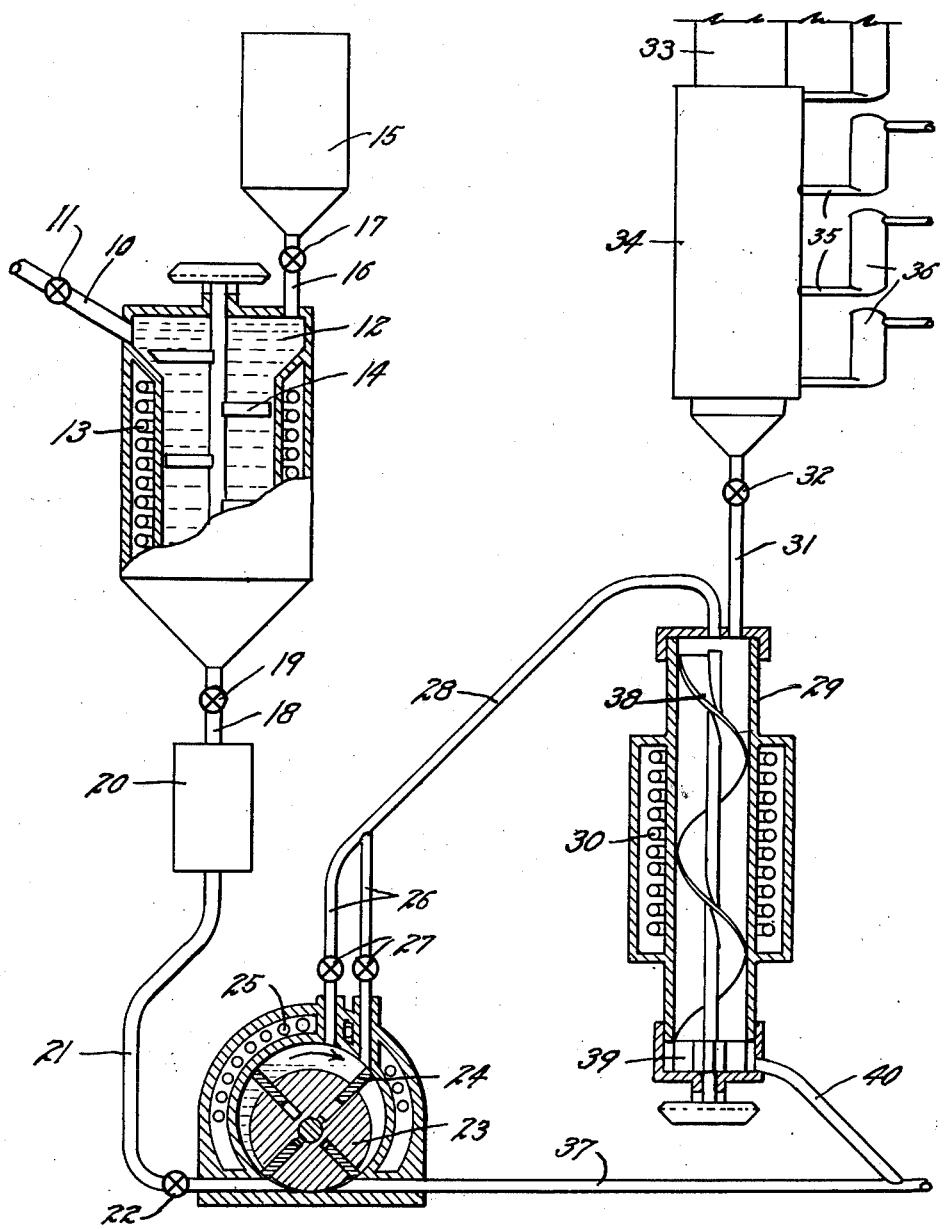
INVENTOR.
HAROLD BROWN
BY
ATTORNEY

United States Patent Office 2,768,128
Patented Oct. 23, 1956

2,768,128
METHOD FOR PROCESSING BLACK OIL

Harold Brown, Denver, Colo.

Application October 29, 1951, Serial No. 253,701

1 Claim. (Cl. 196—73)

This invention relates to a method for extracting hydrocarbon products from black or crude oils, and has for its principal object the provision of a crude or black oil refining process in which the oil and its contained compounds and solids will travel continuously throughout the entire process, so that the process will operate on a continuous flow of oil during its entire operation so that all batch heating and treating will be eliminated.

Another object is to provide a process of this nature in which the oil will be subjected to an instantaneous flash heating as it flows through the process which will instantly separate the flowing liquid oil into vapors and solids.

Other objects and advantages will be found to result from the use of the improved process. These will become more apparent from the following description in which reference is had to the drawing which forms a part hereof.

The drawing is a diagram illustrating the flow of the oil and its contained compounds through the system. It is believed that the process can be best described by following the oil through the system, as diagrammed in the drawing.

The black or crude oil enters the system through a crude oil feed pipe 10 controlled by a suitable control valve 11 and flows directly into a mixing or agitating tank 12. The tank 12 is provided with a jacket heater 13 of any suitable type which will raise the temperature of the oil passing through the tank to a point just below the vaporizing temperature of the lightest hydrocarbon compound contained therein. In order to uniformly distribute the heat throughout the flowing oil, a suitable power-driven agitating mechanism 14 is provided.

A suitable de-sulfurizing agent and catalyst, such as iron oxide, is introduced into the oil flowing through the tank 12 from a catalyst reservoir 15 through a catalyst feed pipe 16 controlled by a suitable regulating valve 17. The hot oil flows continuously from the agitating tank 12 through a discharge pipe 18 controlled by a regulating valve 19 to a filter 20 of any suitable design which will remove solid material and solid catalyst from the flowing oil.

From the filter 20 the oil flows through a hot oil pipe 21 controlled by a valve 22 to a vane-type pressure pump 23. The rotor of the pressure pump is provided with radial vanes 24 which contact the walls of an eccentric pumping chamber. The rotor rotates in the direction of the arrow in the drawing so as to draw crude oil in at the bottom of the pump and elevate it over the top of the pump rotor 23. The entire pump is heated by means of a heating jacket 25, the heat input being sufficient to raise the temperature of the pumped oil above the vaporizing point of the heaviest hydrocarbon compound which it is desired to recover from the oil. The vapors flow from the pump under pressure through one or more vapor pipes 26 controlled by suitable valves 27.

The vapor pipes connect with a vapor riser 28 which directs them into the top of a pressure still 29. The pressure still is provided with a heating jacket 30 which heats the still to a temperature above the vaporizing temperature of the heaviest fluid constituent in the oil. The vapors flowing into the still are instantly subjected to the extreme heat of the still which instantaneously separates all the fluid contents of the oil, in vapor form, from the tars, carbon, sludge, and other solids in the oil.

The hot vapors flow from the still 29 at relatively high pressure, created by the pump 23 and the vaporization in the pump and the still, through a vapor conduit 31, controlled by a valve 32, to a fractioning tower 33 having a suitable heating jacket 34. The vapors rise in and flow from the tower in accordance with their varying specific gravities through a plurality of vertically spaced hydrocarbon outlet pipes 35. The separated vapors are passed through suitable filters 36, and from thence to any of the standard refining treatments.

A portion of the solid materials, sludge, etc., is removed in the pump 23 and forced under pressure from the pump through a sludge discharge 37. The remaining solid compounds which may have been carried through the vapor riser 28 are instantly and continuously precipitated in the still 29 and are scraped from the still walls by means of a scroll scraper 38. The solids fall to a pump-like rotor 39 at the bottom of the still, which forces them as a semi-liquid sludge through a discharge conduit 40 to the sludge discharge 37.

The heating elements diagrammed at 13, 25, 30, and 34 may be of any type suitable for reaching the desired temperatures, such as super-heated steam coils, electric globar elements, and the like. The sludge being discharged from the sludge discharge 37 has sufficient fuel value to provide fuel for heating and operating the entire system without outside sources.

One of the principal features of the improved process is the flash still 29 into which the vapors are forced, both at high temperature and at high pressure, and in which they are instantly subjected to an exceedingly high temperature, which will create an instantaneous and continuous flash separation between the vapors and solids.

When used with oils having very little sludge or solid material, the oil may be fed directly from the hot oil pipe 21 into the still 29, eliminating the pump 23. The pump simply serves to remove the solids from oils having an excessive amount of solid material or sludge.

While preferred forms of the invention have been described in some detail, together with the theories which it is believed to best explain its success, it is to be understood that the invention is not limited to the precise procedure described, nor is dependent upon the accuracy of the theories which have been advanced. On the contrary, the invention is not to be regarded as limited except insofar as such limitations are included within the terms of the accompanying claim in which it is the intention to claim all novelty inherent in the invention as broadly as is permissible in vew of the prior art.

Having thus described the invention, what is claimed and desired secured by Letters Patent is:

In a method of treating crude black oils for the recovery of the lighter hydrocarbon contents therefrom, which comprises continuously admitting the crude oil into a chamber, subjecting the oil in said chamber at atmospheric pressure to a temperature immediately below the vaporizing temperature of the lightest hydrocarbon compound contained therein and simultaneously therewith agitating the oil for uniform distribution of the heat therethrough, continuously withdrawing the heated oil from the chamber at atmospheric pressure and subjecting the same to a filtering operation, subjecting the filtered oil to a vaporizing temperature and pressure, admitting the vapors into a pressure still for removing sludge, heating the vapors further in said still and admitting the vapors into a second chamber having a temperature above the vaporizing temperature of the heaviest fluid constituent in the oil, causing hot oil vapors to flow from said second chamber into a fractioning tower and therein separating the oil vapors in accordance with the different specific gravities thereof, the improvement in said method which comprises a continuous pressure removal of sludge from said pressure still by mechanical means.

References Cited in the file of this patent

UNITED STATES PATENTS

| | | |
|---|---|---|
| 1,872,908 | Doherty | Aug. 23, 1932 |
| 1,942,656 | McNeil | Jan. 9, 1934 |
| 1,986,257 | Erter | Jan. 1, 1935 |
| 2,334,583 | Reeves | Nov. 16, 1943 |
| 2,342,984 | Thomas | Feb. 29, 1944 |
| 2,426,110 | McCorquodale, Jr., et al. | Aug. 19, 1947 |

OTHER REFERENCES

"Petroleum Glossary," Pan American Petroleum & Transport Co., 1922, page 11.

"Chemical Machinery," Riegel, Reinhold Pub. Co., New York, 1944, pages 137–138.